US012752699B2

(12) United States Patent
Song et al.

(10) Patent No.: US 12,752,699 B2
(45) Date of Patent: Oct. 6, 2026

(54) INFORMATION DISPLAY APPARATUS FOR VEHICLE AND METHOD FOR DISPLAYING INFORMATION USING THE SAME

(71) Applicant: HYUNDAI MOBIS CO., LTD., Seoul (KR)

(72) Inventors: Ki Ryong Song, Yongin-si (KR); Sung Joon Ahn, Seoul (KR); Deok Ryong Park, Yongin-si (KR); Moon Sub Hwang, Yongin-si (KR); Hyoung Jin Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 26 days.

(21) Appl. No.: 18/638,942

(22) Filed: Apr. 18, 2024

(65) Prior Publication Data

US 2025/0058705 A1 Feb. 20, 2025

(30) Foreign Application Priority Data

Aug. 17, 2023 (KR) ........................ 10-2023-0107586

(51) Int. Cl.
*B60Q 1/50* (2006.01)
*B60Q 5/00* (2006.01)
*H04W 4/40* (2018.01)

(52) U.S. Cl.
CPC ........... *B60Q 1/544* (2022.05); *B60Q 1/5035* (2022.05); *B60Q 5/005* (2013.01); *H04W 4/40* (2018.02); *B60Q 2400/20* (2013.01)

(58) Field of Classification Search
CPC ...... B60Q 1/544; B60Q 1/5035; B60Q 5/005; B60Q 2400/20; H04W 4/40
USPC ........................................................ 340/425.5
See application file for complete search history.

(56) References Cited

U.S. PATENT DOCUMENTS

| | | | | |
|---|---|---|---|---|
| 6,910,628 | B1 * | 6/2005 | Sehr | G07F 7/1008 705/5 |
| 7,095,318 | B1 * | 8/2006 | Bekhor | B60Q 1/503 340/464 |
| 8,519,840 | B1 * | 8/2013 | Banks | B60Q 1/34 340/475 |
| 9,807,196 | B2 * | 10/2017 | Pisz | G07C 9/22 |
| 10,160,380 | B1 * | 12/2018 | Salter | H05B 47/115 |
| 10,279,683 | B2 * | 5/2019 | Torii | G06V 20/56 |
| 11,025,862 | B1 * | 6/2021 | Lee | H04N 7/142 |
| 11,584,293 | B2 * | 2/2023 | Nobuhara | B60Q 9/008 |

(Continued)

*Primary Examiner* — Brian A Zimmerman
*Assistant Examiner* — Thang D Tran
(74) *Attorney, Agent, or Firm* — NovoTechIP International PLLC

(57) ABSTRACT

An apparatus and method for providing information about a vehicle are disclosed. The apparatus for displaying information about a vehicle to provide information when a user boards or alights from the vehicle includes: a wireless communication module configured to recognize that the user approaches the vehicle and deviates from the vehicle by a predetermined distance or more; a display configured to display information, which has a display region in a predetermined region between a first-row window and a second-row window on a side of the vehicle; and a controller that controls information corresponding to the user to be displayed in the display region of the display based on user's approaching or alighting recognized by the wireless communication module.

6 Claims, 14 Drawing Sheets

(A)

(B)

(56) References Cited

U.S. PATENT DOCUMENTS

| | | | | |
|---|---|---|---|---|
| 11,900,425 | B2 * | 2/2024 | Hadano | G06Q 30/0283 |
| 2004/0113763 | A1 * | 6/2004 | Bendavid | G07C 5/0866 |
| | | | | 348/E7.086 |
| 2005/0231337 | A1 * | 10/2005 | Tourneur | B60Q 1/324 |
| | | | | 340/426.28 |
| 2006/0155465 | A1 * | 7/2006 | Jung | G01C 21/20 |
| | | | | 701/533 |
| 2010/0156672 | A1 * | 6/2010 | Yoo | B62D 15/0285 |
| | | | | 340/436 |
| 2014/0143839 | A1 * | 5/2014 | Ricci | H04N 21/41422 |
| | | | | 726/4 |
| 2014/0189528 | A1 * | 7/2014 | Chang | H04M 1/6075 |
| | | | | 715/752 |
| 2015/0194082 | A1 * | 7/2015 | McEwan | G09F 13/02 |
| | | | | 40/591 |
| 2016/0200254 | A1 * | 7/2016 | Raab | H04N 23/698 |
| | | | | 348/148 |
| 2017/0057430 | A1 * | 3/2017 | Kim | B60R 13/04 |
| 2017/0158115 | A1 * | 6/2017 | Linden | B60Q 1/324 |
| 2017/0200308 | A1 * | 7/2017 | Nguyen | G06T 1/20 |
| 2017/0210339 | A1 * | 7/2017 | Dry | G07C 9/00698 |
| 2017/0213459 | A1 * | 7/2017 | Ogaz | G08G 1/166 |
| 2017/0313247 | A1 * | 11/2017 | Hsu | G08G 1/165 |
| 2018/0065537 | A1 * | 3/2018 | Abrams | H05B 47/19 |
| 2018/0079356 | A1 * | 3/2018 | Watanabe | B60Q 1/543 |
| 2018/0322431 | A1 * | 11/2018 | Folck | G01S 19/51 |
| 2018/0357905 | A1 * | 12/2018 | Boss | B62D 15/028 |
| 2019/0031102 | A1 * | 1/2019 | Kishimoto | B60R 1/30 |
| 2019/0108014 | A1 * | 4/2019 | Nakamura | B60R 16/02 |
| 2019/0197882 | A1 * | 6/2019 | Camras | B60Q 1/2673 |
| 2019/0215671 | A1 * | 7/2019 | Takii | H04L 51/58 |
| 2020/0066693 | A1 * | 2/2020 | Kim | H05K 1/02 |
| 2020/0111230 | A1 * | 4/2020 | Terhaar | G08G 1/167 |
| 2020/0175866 | A1 * | 6/2020 | Yamashita | G08G 1/096725 |
| 2020/0241529 | A1 * | 7/2020 | Salter | G06V 10/811 |
| 2020/0310441 | A1 * | 10/2020 | Noguchi | B62D 1/00 |
| 2020/0327460 | A1 * | 10/2020 | Suzuki | H04W 4/024 |
| 2020/0343923 | A1 * | 10/2020 | Hoshino | H04B 1/3822 |
| 2020/0349836 | A1 * | 11/2020 | Shibata | G08G 1/0965 |
| 2020/0406860 | A1 * | 12/2020 | Mai | B60R 25/31 |
| 2021/0146827 | A1 * | 5/2021 | Bush | B60Q 1/2603 |
| 2021/0162914 | A1 * | 6/2021 | Han | B60Q 1/544 |
| 2021/0197721 | A1 * | 7/2021 | Huang | B60K 35/28 |
| 2021/0312840 | A1 * | 10/2021 | Kim | B60K 35/10 |
| 2021/0362598 | A1 * | 11/2021 | Oh | G06Q 30/02 |
| 2022/0009406 | A1 * | 1/2022 | Harada | B60Q 1/0023 |
| 2022/0017072 | A1 * | 1/2022 | Hayakawa | B60Q 1/507 |
| 2022/0032839 | A1 * | 2/2022 | Kim | B60Q 1/28 |
| 2022/0044571 | A1 * | 2/2022 | Luo | G08G 1/202 |
| 2022/0097597 | A1 * | 3/2022 | Nicholson | B60Q 3/14 |
| 2022/0101633 | A1 * | 3/2022 | Nishiyama | G06T 7/20 |
| 2022/0144164 | A1 * | 5/2022 | Tani | B60Q 1/507 |
| 2022/0156870 | A1 * | 5/2022 | Jiang | B60R 21/12 |
| 2022/0203884 | A1 * | 6/2022 | Cech | G06V 20/593 |
| 2022/0319514 | A1 * | 10/2022 | Hosomi | G10L 15/22 |
| 2022/0363194 | A1 * | 11/2022 | Windeler | H04N 7/181 |
| 2023/0103839 | A1 * | 4/2023 | Nelson | G07C 5/0841 |
| | | | | 726/4 |
| 2023/0322251 | A1 * | 10/2023 | Kim | B60W 50/14 |
| 2023/0350621 | A1 * | 11/2023 | Salter | B60Q 1/544 |
| 2025/0034919 | A1 * | 1/2025 | Wilke | B29C 45/1679 |
| 2025/0104001 | A1 * | 3/2025 | Liu | G06Q 50/265 |
| 2025/0318395 | A1 * | 10/2025 | Takagi | G02B 5/22 |

* cited by examiner (A)

(B)

(A) (B)

(A) (B)

INFORMATION DISPLAY APPARATUS FOR VEHICLE AND METHOD FOR DISPLAYING INFORMATION USING THE SAME

CROSS-REFERENCE TO RELATED APPLICATIONS

This application claims the benefit of Korean Patent Application No. 10-2023-0107586, filed on Aug. 17, 2023, which is hereby incorporated by reference as if fully set forth herein.

TECHNICAL FIELD

The embodiments of the present disclosure relate to an apparatus for displaying vehicle information and a method for displaying vehicle information using the same, and more particularly to an apparatus for displaying information that requires confirmation when a user boards or alights from the vehicle and a method for efficiently displaying information using the same.

BACKGROUND

As electric vehicles have rapidly come into widespread use, the existing radiator grill region is no longer required for vehicles, a new trend for vehicles has emerged to display information about vehicle charging and other necessary information by illuminating a front grill region of each vehicle.

FIG. 1 is a conceptual diagram illustrating an apparatus for displaying vehicle information using a front grill region.

(A) and (B) of FIG. 1 are views illustrating design examples of a recently announced concept vehicle. In the concept designs shown in (A) and (B) of FIG. 1, the degree of freedom in design of a grill region of an electric vehicle is used in vehicle designs, and information about such vehicles can be displayed using the resultant designs.

However, when using a vehicle designed to display information on the grill region thereof, a user who boards a vehicle from the rear or side directions of the vehicle has difficulty in recognizing vehicle information that has occurred before boarding.

SUMMARY

Accordingly, embodiments of the present disclosure are directed to an information display apparatus for a vehicle and a method for displaying information using the same that substantially obviate one or more problems due to limitations and disadvantages of the related art.

To solve the above-described problems, the embodiments of the present disclosure provide an apparatus for displaying information requiring confirmation when a user boards or alights from the vehicle in consideration of convenience of the user who has to perform such confirmation, and a method for efficiently displaying information using the apparatus.

Specifically, the embodiments of the present disclosure relate to an apparatus for displaying information about a vehicle, which can efficiently utilize a vehicle state and vehicle information before or after a user boards or alights from the vehicle by applying an information display optical system to a B-pillar region for natural information transmission before the user boards the vehicle, and a method for displaying information using the same.

Meanwhile, the B-pillar region is a limited space, and an efficient optical system structure designed to consider the B-pillar region is proposed.

Technical tasks obtainable from the present disclosure are non-limited by the above-mentioned technical tasks. And other unmentioned technical tasks can be clearly understood from the following description by those having ordinary skills in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, a method - - - may include In accordance with an embodiment of the present disclosure, an apparatus for displaying information about a vehicle to provide information when a user boards or alights from the vehicle may include: a wireless communication module configured to recognize that the user approaches the vehicle and deviates from the vehicle by a predetermined distance or more; a display configured to display information, which has a display region in a predetermined region between a first-row window and a second-row window on a side of the vehicle; and a controller that controls information corresponding to the user to be displayed in the display region of the display based on user's approaching or alighting recognized by the wireless communication module.

The display region may be disposed in a B-pillar region of the vehicle; and the display may include one or more types of a first type of a direct lighting concept or a second type of an indirect lighting concept.

The controller may be configured such that information required to be confirmed by the user who boards the vehicle is displayed on the display region based on an operation of the wireless communication module that recognizes the user's approaching to the vehicle.

The information required to be confirmed by the user who boards the vehicle may include: location information that requires confirmation of external impact of the vehicle, locking/unlocking information, battery charging rate information, drivable distance information, temperature information, expected weather information, and frequently-used road traffic information.

The information required to be confirmed by the user who alights from the vehicle may include: the controller is configured such that information required to be confirmed by the user who alights from the vehicle is displayed on the display region based on an operation of the wireless communication module that recognizes the user's alighting from the vehicle.

The information required to be confirmed by the user who alights from the vehicle may include information on items left in the vehicle, infant/child information, and companion animal information.

The apparatus may further include a vibration speaker additionally mounted on a side surface of the vehicle, and the information corresponding to the user is also provided as sound through the vibration speaker.

The direct lighting concept may include: a plurality of micro-LEDs disposed in a region exposed to the outside between bezels of the B-pillar; and a lens disposed between the bezels of the B-pillar to control light emitted through the micro-LED.

The indirect lighting concept may include: an E-ink module configured to express patterns in a region exposed to the outside between the bezels of the B-pillar; and a light source configured to emit light toward the E-ink module on each side of the bezels of the B-pillar.

In accordance with another embodiment of the present disclosure, a method for providing information about a vehicle to provide information when a user boards or alights from the vehicle may include: based on recognition of a user who approaches the vehicle, displaying information required to be confirmed by a user who boards the vehicle on a display having a display region within a predetermined region between a first-column window and a second-column window of a side surface of the vehicle; and based on recognition of a user who alights from the vehicle by a predetermined distance or more, displaying information required to be confirmed by the user on the display.

The information required to be confirmed by the user who boards the vehicle may include: location information that requires confirmation of external impact of the vehicle, locking/unlocking information, battery charging rate information, drivable distance information, temperature information, expected weather information, and frequently-used road traffic information.

The information required to be confirmed by the user who alights from the vehicle may include information on items left in the vehicle, infant/child information, and companion animal information.

At least one of the information required to be confirmed when boarding or the information required to be confirmed when alighting may additionally include sound information through a vibration speaker provided on a side of the vehicle.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

DETAILED DESCRIPTION

Figure 1:
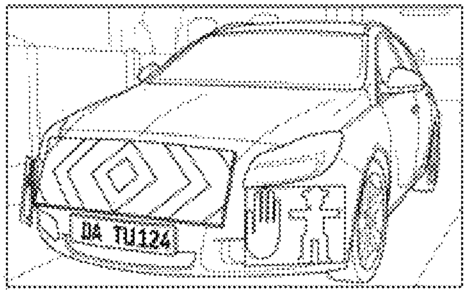
FIG. 1 is a conceptual diagram illustrating an apparatus for displaying vehicle information using a front grill region.
Figure 1:
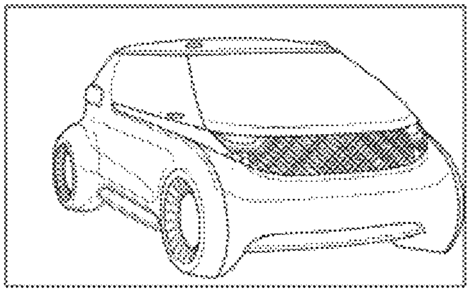

Hereinafter, embodiments of the present disclosure will be described in detail with reference to the accompanying drawings so that the present disclosure may be easily realized by those skilled in the art. However, the present disclosure may be achieved in various different forms and is not limited to the embodiments described herein. In the drawings, parts that are not related to a description of the present disclosure are omitted to clearly explain the present disclosure and similar reference numbers will be used throughout this specification to refer to similar parts.

In the specification, when a part "includes" an element, it means that the part may further include another element rather than excluding another element unless otherwise mentioned.

In addition, the "user" of a vehicle, as used in the following description, includes not only a driver of the vehicle and passengers riding in the vehicle, but also passengers of an unmanned vehicle.

Figure 2:
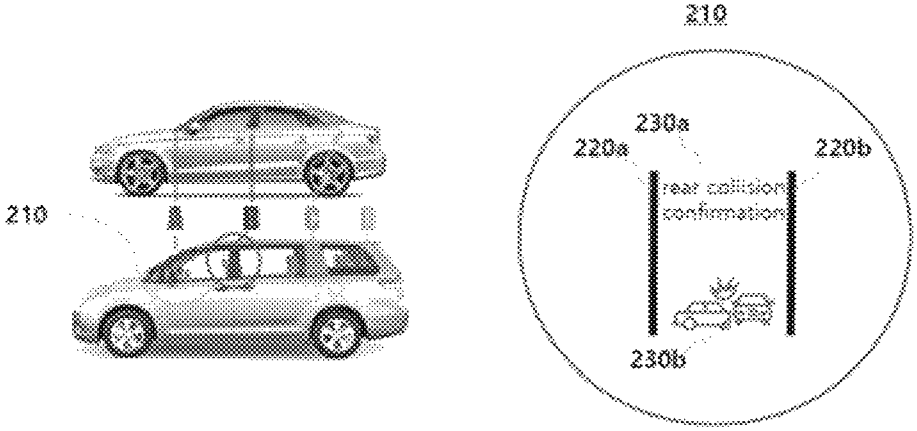
FIG. 2 is a conceptual diagram illustrating an apparatus for displaying vehicle information according to an embodiment of the present disclosure.

FIG. 2 is a conceptual diagram illustrating an apparatus for displaying vehicle information according to an embodiment of the present disclosure.

When a user approaches a vehicle and boards the vehicle, and/or when the user alights from the vehicle and deviates from the vehicle by a predetermined distance, the position where information about the vehicle can be most efficiently transmitted may be a B-pillar region 210 as shown in FIG. 2.

In the embodiment shown in FIG. 2, as an example of information 230 that needs to be confirmed about the vehicle when the user boards the vehicle, the information 230 is displayed between the bezels (220*a*, 220*b*) of the B-pillar region 210. In FIG. 2, the information 230 may indicate that there has occurred an impact to the vehicle while parking so that the rear side of the vehicle needs to be confirmed by the user or driver.

Such rear collision confirmation information may include one or more of text information 230*a* and/or image information 230*b*. However, since the B-pillar region 210 is a limited space region and it is desirable that the information display apparatus be simple in structure, it is preferable that the displayed information be required to provide information with a minimum number of design elements.

Although the embodiment of FIG. 2 illustrates an example in which the information display apparatus is provided in the B-pillar region 210, the scope of the embodiment is not limited thereto. For example, a vehicle design with no fillers is possible depending on the vehicle, and embodiments of the present disclosure aim to implement an information display apparatus in an area where the user can most naturally confirm information when boarding/alighting from the vehicle. Therefore, a vehicle region where the above purpose can be achieved is proposed as a "region between first-column windows and second-column windows on the side of the vehicle".

Figure 3:
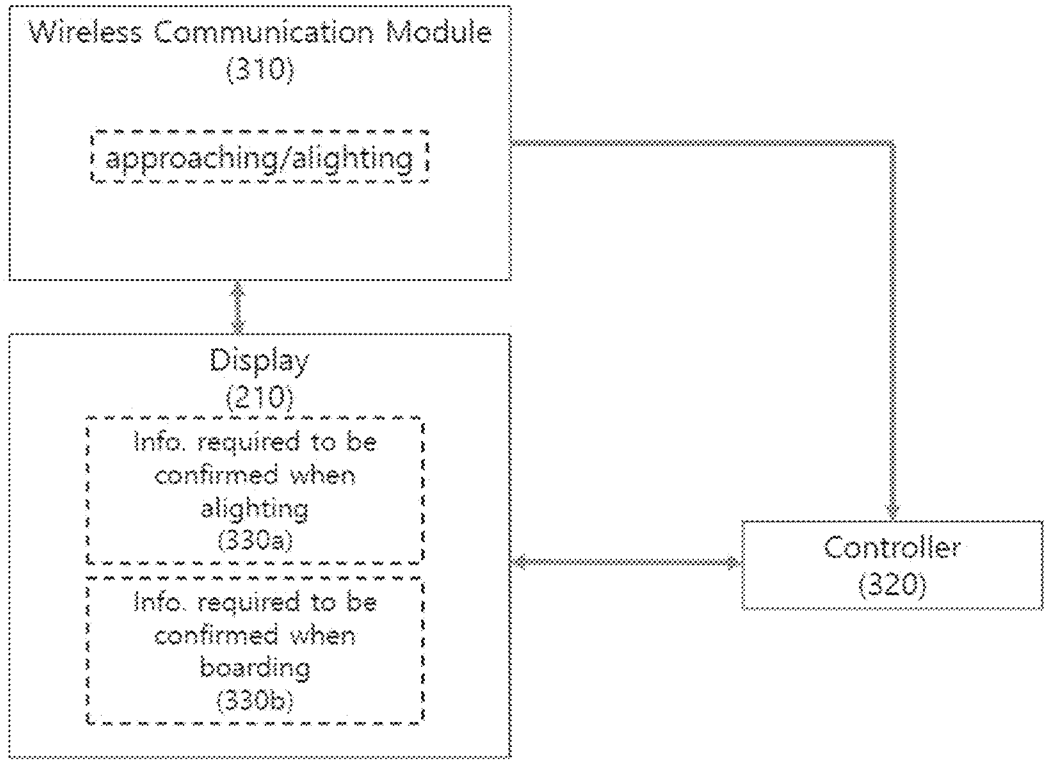
FIG. 3 is a structural diagram illustrating an apparatus for displaying vehicle information according to an embodiment of the present disclosure.

FIG. 3 is a structural diagram illustrating an apparatus for displaying vehicle information according to an embodiment of the present disclosure.

First, the vehicle information display apparatus shown in FIG. 3 may include a wireless communication unit 310 configured to recognize or detect whether the user approaches the vehicle and leaves the vehicle by a predetermined distance or more. For example, the operation in which the user carrying a smart key/mobile key of the vehicle approaches/leaves the vehicle can be recognized or detected through the wireless communication unit 310, and this information will be provided to the controller 320 to be described later.

In addition, the apparatus for displaying vehicle information as shown in FIG. 3 may include a display unit 210 for displaying information having a display region in a predetermined region between the first-row window and the second-row window on the side of the vehicle. The predetermined region between the first-row window and the second-row window on the side of the vehicle may be the B-pillar region as described above, without being limited thereto. In addition, the display unit 210 for displaying vehicle information according to the embodiment is proposed as an optical system that can implement a thin display lighting concept suitable for a limited space such as the B-pillar region.

The information displayed through the display unit 210 may include at least one of boarding-user information **330*a* required to be confirmed when the user boards the vehicle and alighting-user information 330*b* required to be confirmed (330*b***) when the user alights from the vehicle.

For example, as shown in FIG. 2, the boarding-user information **330*a*** that needs to be confirmed by the user who boards the vehicle may include not only location information that requires confirmation of external impact of the vehicle, but also locking/unlocking information, battery charging rate information, drivable distance information, temperature information, frequently-used road traffic information, etc.

In addition, the alighting-user information **330*b*** that needs to be confirmed when the user alights from the vehicle may include information on items left in the vehicle, infant/child information, companion animal information, etc.

Meanwhile, the vehicle information display apparatus shown in FIG. 3 may include a controller 320 that controls information requiring user confirmation to be displayed on the display region of the display unit 210 based on the user's approaching or leaving detected or recognized by the wireless communication unit 310.

The controller 320 may be mechanically integrated with the display unit 210. Alternatively, the controller 320 may also be implemented as a part of an ECU. Therefore, in the structural description below, the controller 320 will be omitted for brevity.

Meanwhile, the information display apparatus according to one embodiment of the present disclosure may further include a vibration speaker (not shown) additionally mounted to the side of the vehicle.

According to this embodiment, information corresponding to the user's boarding/alighting may be provided as sound through the vibration speaker (not shown). For example, when the user alights and deviates from the vehicle by a predetermined distance or more and a child or infant remains in a back seat of the vehicle, the information display apparatus according to the present disclosure can be configured such that image information is displayed through the display unit 210 and a warning or guidance voice is displayed through a vibration speaker (not shown).

Considering the current vehicle structure, it is realistic to form the display region of the display unit 210 in the B-pillar region.

A method for efficiently implementing the display unit 210 when the display region is formed in the B-pillar region with a limited space will hereinafter be described in detail. For convenience of description, the method for efficiently implementing the display unit 210 will hereinafter be described in different ways according to a first type of a direct lighting method and a second type of an indirect lighting method.

Figure 4:
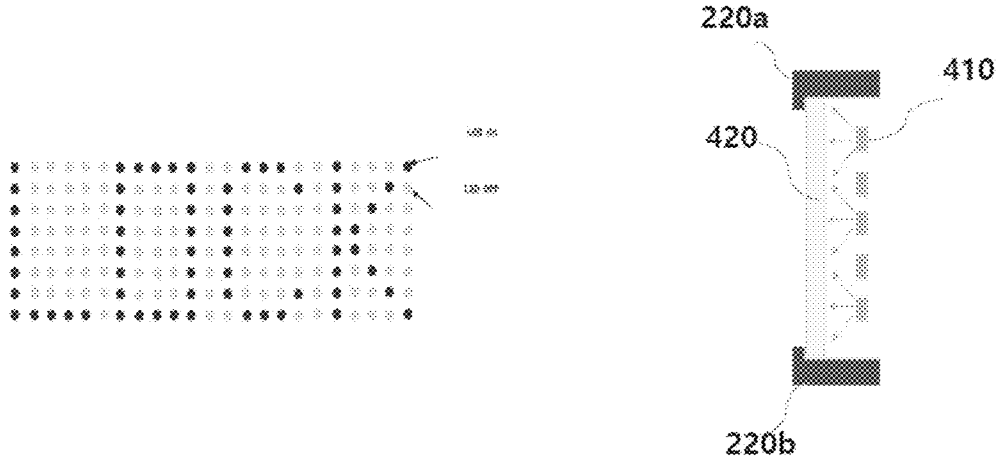
FIGS. 4 and 5 are diagrams illustrating examples of a direct lighting concept according to an embodiment of the present disclosure.
Figure 5:
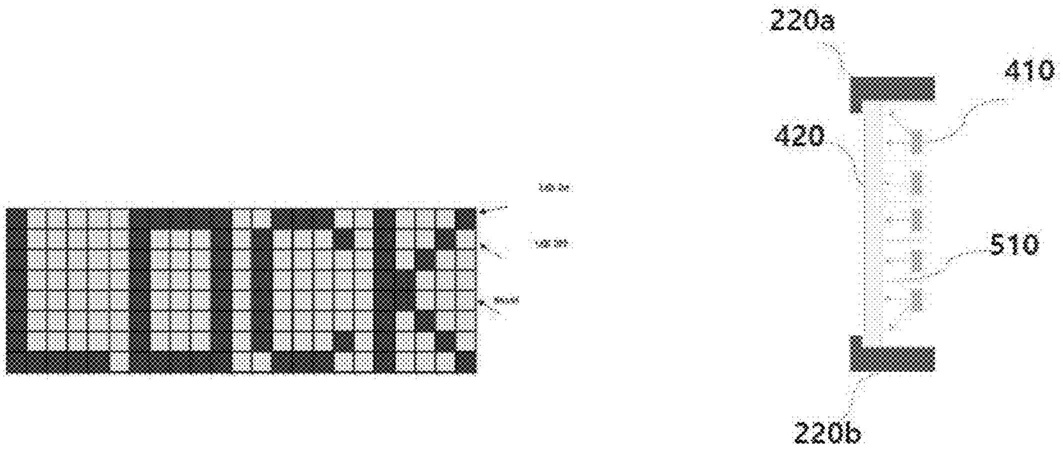

FIGS. 4 and 5 are diagrams illustrating examples of a direct lighting concept according to an embodiment of the present disclosure.

In examples of the first type of display using the direct lighting method (or a direct lighting-type display), as shown in FIGS. 4 and 5, a plurality of micro-LEDs 410 is disposed in the region exposed to the outside between the bezels **220*a* and 220*b* of the B pillar, and a lens 420 for controlling light emitted through the micro LED 410 is disposed between the bezels 220*a* and 220*b*** of the B pillar.

Specifically, FIG. 4 shows a structure in which a plurality of micro LEDs 410 is directly exposed and can be turned on/off separately from each other, and information can be displayed by controlling ON/OFF actions of individual LEDs as shown in (A) of FIG. 4.

Meanwhile, FIG. 5 shows a method for displaying information by turning individual lights on or off after implementing a segment using the bezel 510.

In the embodiment of FIG. 4, a boundary between segments is not displayed because there is no segment implementation using the bezel 510, whereas in the embodiment of FIG. 5, a boundary between the segments using the bezel 510 can be displayed.

FIGS. 6 to 9 are diagrams illustrating examples of an indirect lighting-type display according to an embodiment of the present disclosure.

Figure 6:
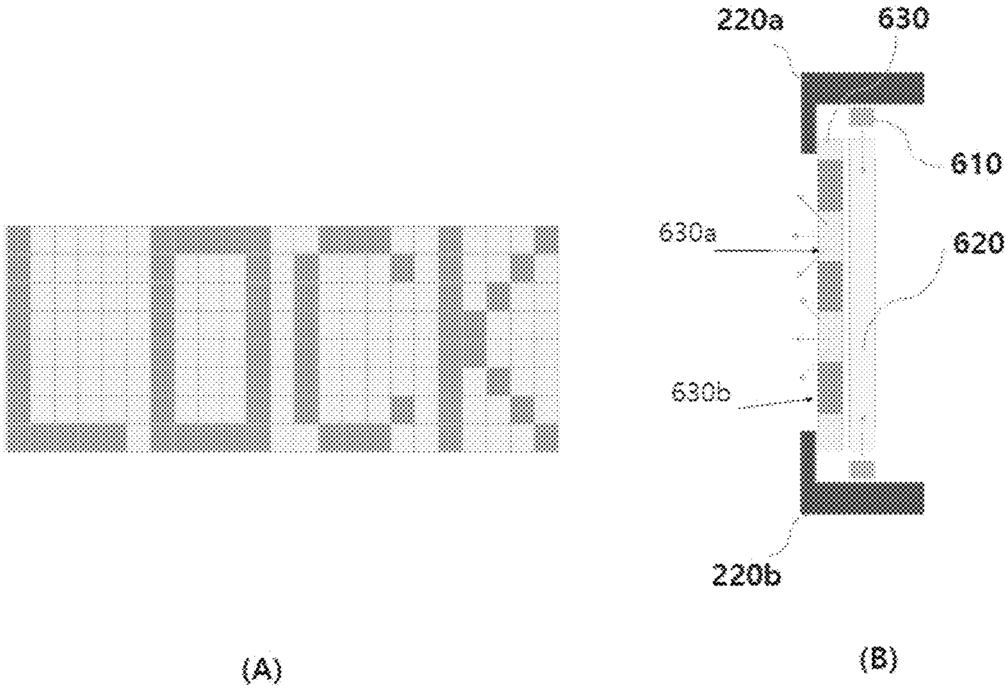
FIGS. 6 to 9 are diagrams illustrating examples of an indirect lighting concept according to an embodiment of the present disclosure.
Figure 7:
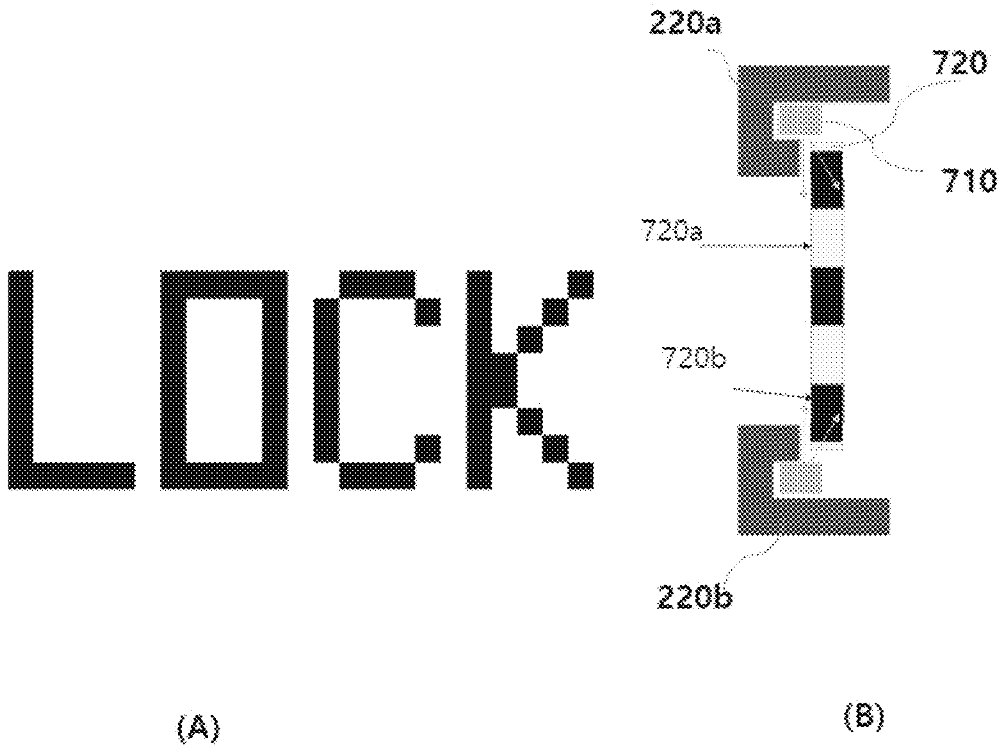
Figure 8:
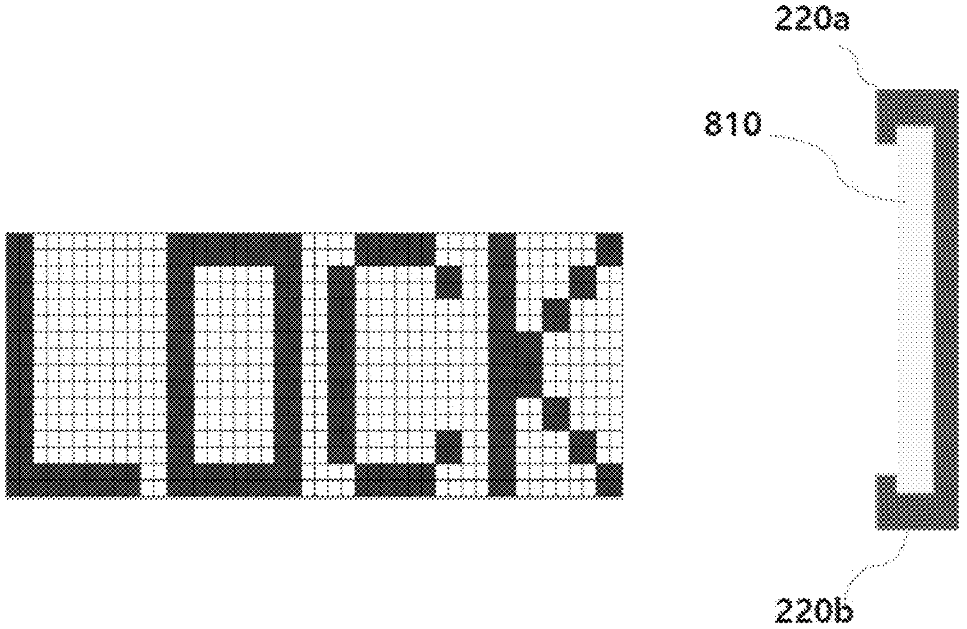

Specifically, FIG. 6 shows an embodiment using the electrochromic film 630, and FIG. 7 shows an embodiment using the E-ink module 720, composed of individual E-ink display elements such as **720*a* and 720*b*. Additionally, FIG. 8 shows an example using the OLED/LCD module 810, and FIG. 9** shows an example using a projection optical system.

All of the embodiments of the indirect lighting concept shown in FIGS. 6 to 9 may commonly include a display module capable of expressing patterns in the region exposed to the outside between the bezels **220*a* and 220*b*** of the B-pillar.

Specifically, referring to (B) of FIG. 6 in the embodiment using the electrochromic film 630 of FIG. 6, the electrochromic film 630 capable of expressing patterns can be displayed in the externally exposed region between the bezels **220*a* and 220*b*** of the B-pillar.

Light emitted from the LED 610 may be reflected by a reflective material 620 and irradiated to the electrochromic film 630. The electrochromic film 630 may include a pattern **630*a* with high transmittance and a pattern 630*b* with low transmittance according to ON/OFF actions of power, and light irradiated through the LED 610 and the reflective material 620** can be selectively transmitted so that information requiring confirmation of the user who boards the vehicle and/or information requiring confirmation of the user who alights from the vehicle can be displayed.

Referring to (B) of FIG. 7 illustrating the embodiment using the E-ink module 720, the E-ink module 720 capable of expressing patterns can be displayed in the externally exposed region between the bezels 220*a* and 220*b* of the B-pillar.

As will be explained in more detail below, since displaying information only through the E-ink module 720 has poor visibility in dark places or at night, the light source 710 configured to emit light toward the E-link module 720 may be additionally installed at each of the bezels 220*a* and 220*b* of the B-pillar as shown in (B) of FIG. 7.

Referring to (B) of FIG. 8 illustrating the embodiment using the OLED/LCD module 810 of FIG. 8, the OLED/LCD capable of expressing patterns can be displayed in the externally exposed region between the bezels 220*a* and 220*b* of the B-pillar.

Figure 9:
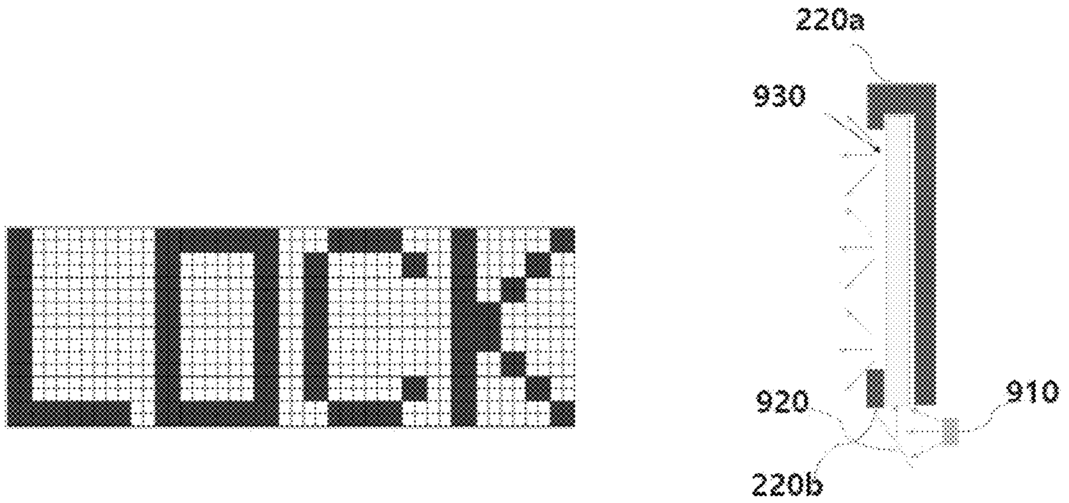

Referring to (B) of FIG. 8 illustrating the embodiment using the projection optical system of FIG. 9, a lens 930 capable of expressing patterns may be disposed in the externally exposed region between the bezels 220*a* and 220*b* of the B pillar.

Specifically, light irradiated from the projection optical system 910 may be reflected by the reflective material 920 and incident upon the lens 930, and the same information as those of (A) of FIG. 9 may be displayed according to the pattern formed by the lens 930.

According to the embodiment using the electrochromic film 630 shown in FIG. 6, a grid for each segment can be seen as shown in (A) of FIG. 6. According to the embodiment using the E-ink module 720 of FIG. 7, the grid may be invisible as shown in (A) of FIG. 7.

Meanwhile, both the embodiment using the OLED/LCD module 810 shown in FIG. 8 and the embodiment using the projection optical system shown in FIG. 9 have disadvantages in that the grid is visible as shown in (A) of FIG. 8 or 9. However, since the display has a high resolution compared to the embodiments of FIGS. 6 and 7, the degree to which the grid is visible to the user may be very low.

Figure 10:
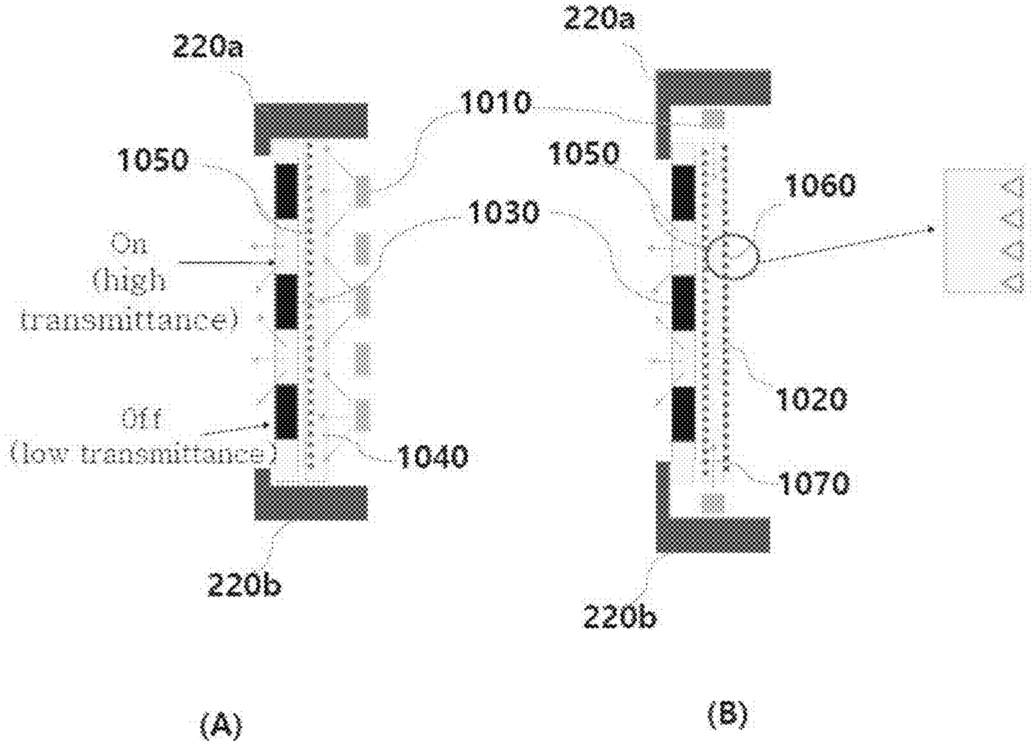
FIGS. 10 and 11 are diagrams illustrating a structure of a display designed to use an electrochromic film according to embodiments of the present disclosure.
Figure 11:
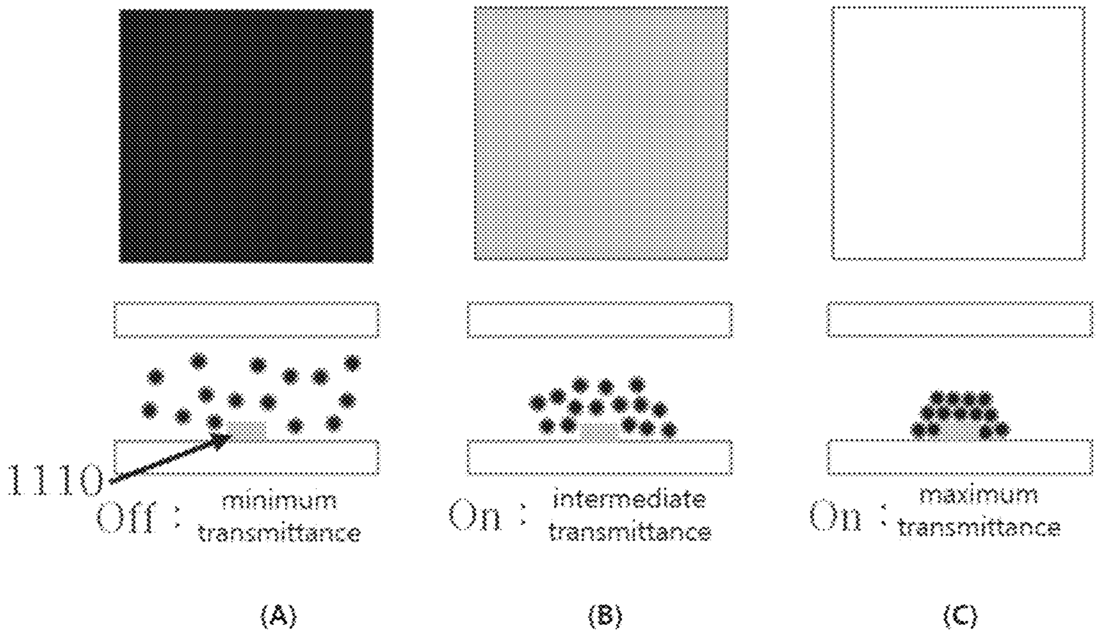

FIGS. 10 and 11 are diagrams illustrating a structure of the display designed to use the electrochromic film according to embodiments of the present disclosure.

Specifically, the light source unit 1010 on the back surface of the structure of FIG. 10 may be configured as a direct optical system as shown in (A) of FIG. 10, or may be configured as an indirect optical system as shown in (B) of FIG. 10. In this way, the light source unit 1010 is configured to be implemented as a surface light source in which a light emitting area is uniformly turned on, and the area of the electrochromic film 1050 on the front surface of the structure of FIG. 10 can be implemented as an optical system capable of displaying information through individual lighting on/off actions after distinguishing the segments from each other.

Unless a current is applied to the electrochromic film using nanoscale particles deposited on a substrate as shown in (A) of FIG. 11, the nanoscale particles are evenly distributed to a certain area so that a corresponding portion, e.g. 1030, of the electrochromic film remains at a low transmittance. The electrochromic film can be driven by a mechanism that can increase transmittance of the certain area by collecting back particles at a specific point 1110 as shown in (C) of FIG. 11, and the intensity of current can be adjusted to adjust transmittance as shown in (A), (B), and (C) of FIG. 11.

Unless a current is applied to the electrochromic film using nanoscale particles deposited on a substrate as shown in (A) of FIG. 11, the nanoscale particles are evenly distributed to a certain area so that the electrochromic film remains at a low transmittance. The electrochromic film can be driven by a mechanism that can increase transmittance of the certain area by collecting back particles at a specific point 1110 as shown in (C) of FIG. 11, and the intensity of current can be adjusted to adjust transmittance as shown in (A), (B), and (C) of FIG. 11.

According to characteristics of the diffusion material 1040 of the direct optical system shown in (A) of FIG. 10, the diffusion material 1040 is characterized in that point light sources of the general LED 1010 are configured such that the point light sources can be evenly turned on.

In (B) of FIG. 10, the reflective material 1070 of the indirect optical system is characterized in that the LED 1010 is placed on the side surface 1020 of the reflective material 1070 and light can be emitted to the front surface portion by the optics 1060 of the back surface portion of the reflective material 1070.

In the example of FIG. 10, the electrochromic film 1050 may be implemented as a diffusion material 1040 or a separate material isolated from the reflective material 1070, and may also be implemented as one module through deposition on the front surface portion of the diffusion material 1040 and the reflective material 1070.

In FIG. 10, an additional stereoscopic angle adjusting film 1050 (or a deposition layer) is added between the electrochromic film 1050 and the diffusion material 1040/reflective material 1070 of the direct/indirect optical system to limit a diffusion angle of light in the light emitting area to a level of 0° to 50°, thereby realizing high luminance in the light emitting unit.

Additionally, according to the present embodiment, it is possible to display information in various colors depending on the color of the LED light source 1010 of the direct/indirect optical system.

Figure 12:
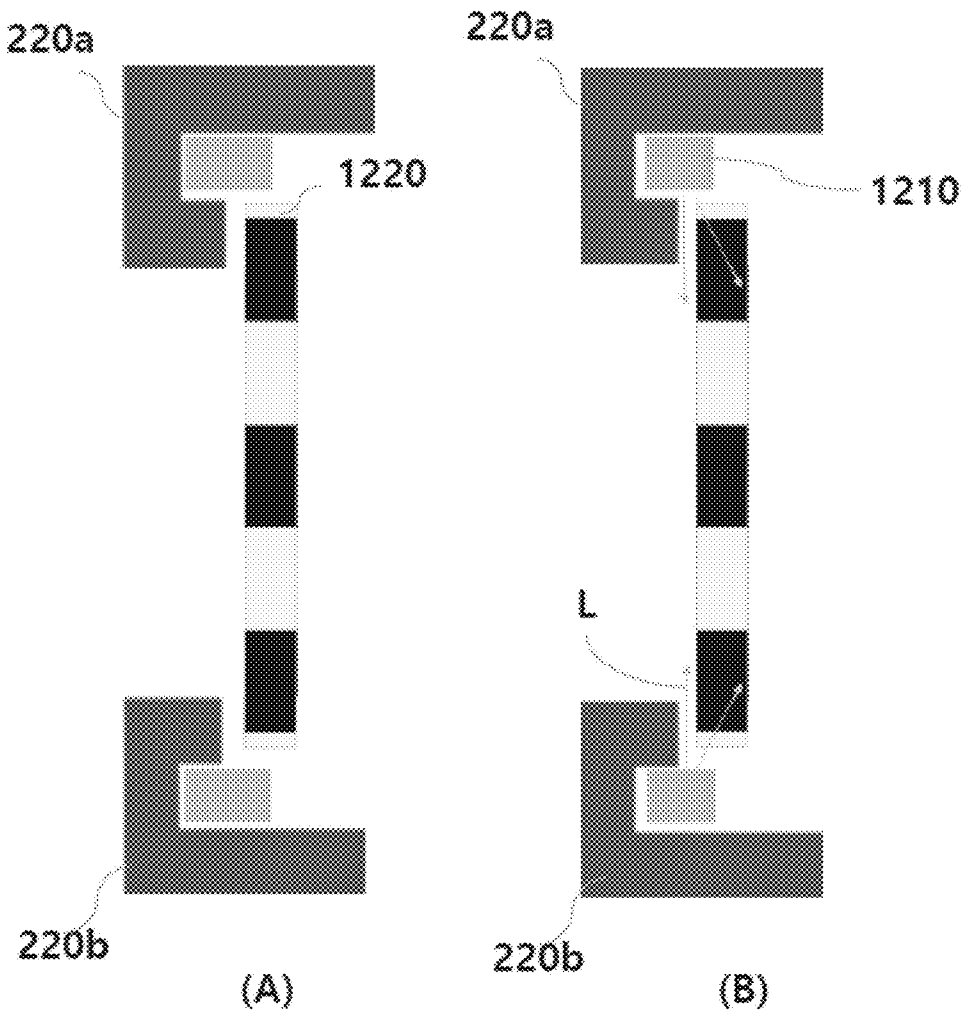
FIGS. 12 and 13 are diagrams illustrating examples of a display designed to use E-ink according to embodiments of the present disclosure.
Figure 13:
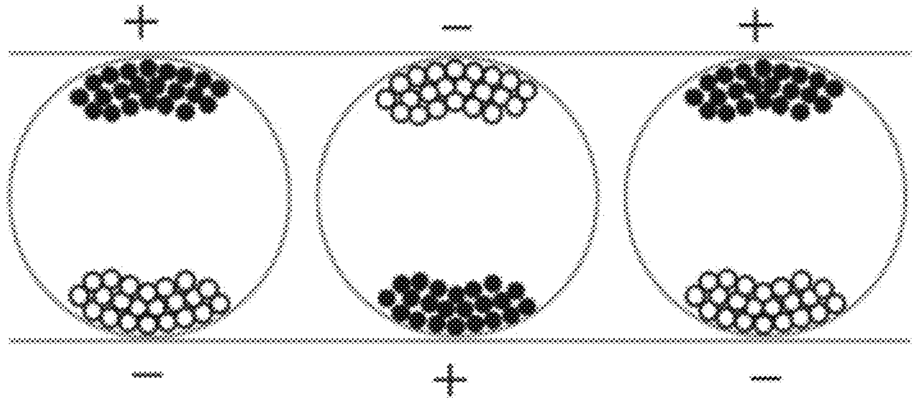

FIGS. 12 and 13 are diagrams illustrating examples of the display designed to use the E-ink according to embodiments of the present disclosure.

Specifically, FIG. 12 is a conceptual diagram illustrating a display using the E-ink module 1220, which is not a display with a general self-luminous concept. FIG. 13 is a conceptual diagram illustrating a display in which black and white nanoparticles are displayed in an array affected by movement through charging of anodes and cathodes so that information can be displayed in black and white.

However, when using the E-ink module 1220, visibility is degraded in night/dark environments, so that the embodiments of the present disclosure illustrate that such visibility is improved by turning on the upper and lower light sources 1210 as shown in FIG. 12.

The light source 1210, which is additionally disposed according to the present embodiments, may be disposed on each side (220*a*, 220*b*) of the bezels of the B-pillar as shown in FIG. 12, and the structures of the bezels (220*a*, 220*b*) may be spatially efficient to surround the light source by considering the arrangement of the light sources 1210.

Figure 14:
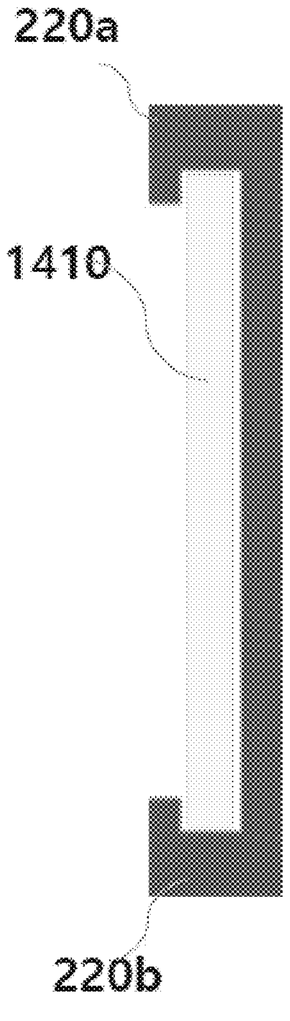
FIG. 14 is a diagram illustrating an example structure designed to use OLED/LCD according to an embodiment of the present disclosure.
Figure 15:
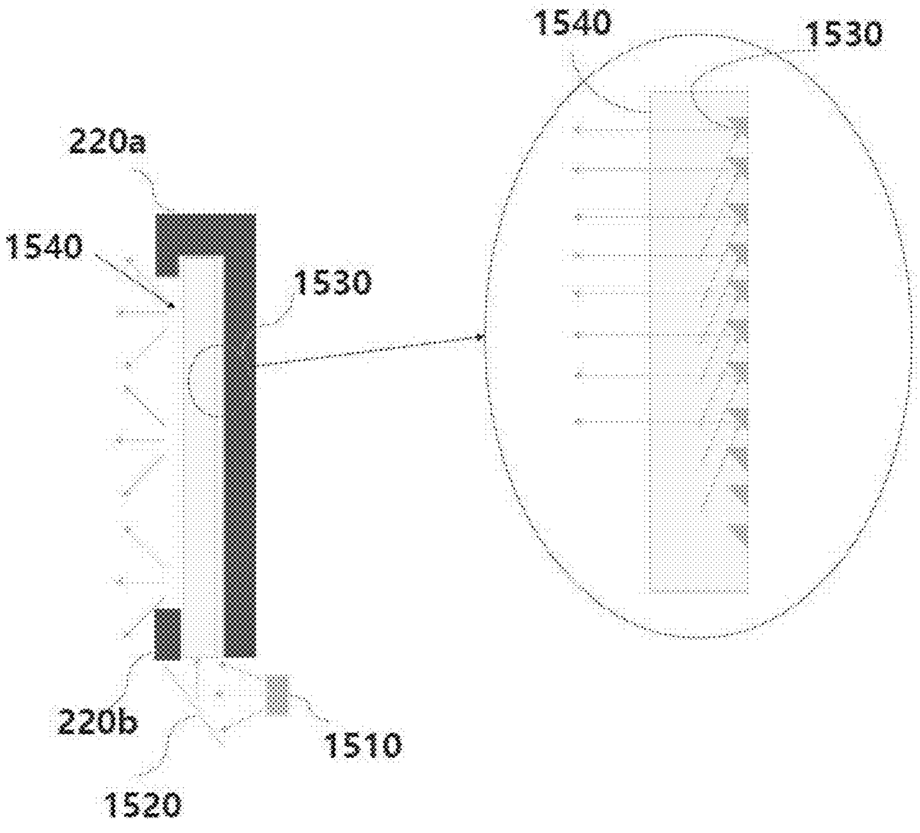
FIG. 15 is a diagram illustrating an example structure designed to use a projection optical system according to an embodiment of the present disclosure.

FIG. 14 is a diagram illustrating an example structure designed to use OLED/LCD according to an embodiment of the present disclosure. FIG. 15 is a diagram illustrating an example structure designed to use a projection optical system according to an embodiment of the present disclosure.

The embodiment using the OLED/LCD 1410 shown in FIG. 14 may have disadvantages in that a high-resolution display can be implemented but may have a disadvantage of increasing costs.

Accordingly, as shown in FIG. 15, the information display concept can be implemented in a thin space using the projection optical system 1510, and a variable information image is emitted from the projection optical system 1510 so that the variable information image is reflected into a region between the bezels (220*a*, 220*b*) of the B-pillar through the lens 1540 of the reflective material 1520.

The projection optical system 1510 is a projection optical system technology that is an optical system concept that allows variable high-resolution images to vary using MEMS-based (DMD, DLP, laser scanning, etc.) technology.

As shown in an enlarged view on the right side of FIG. 15, the optical path may be adjusted in a certain direction with fine optics 1530 at the back surface 1530 of the lens region 1540, so that the visibility of the user can be improved.

A detailed description of preferred embodiments of the present disclosure disclosed as described above is provided so that those skilled in the art can implement and embody the present disclosure. Although the description is made with reference to the preferred embodiments of the present disclosure, it will be appreciated by those skilled in the art that various modifications and variations can be made in the present disclosure without departing from the spirit or scope of the disclosures. For example, those skilled in the art may use the respective components described in the above-described embodiments in a manner of combining them with each other.

Accordingly, the present disclosure is not intended to be limited to the embodiments shown herein, but to be given the broadest scope that matches the principles and novel features disclosed herein.

As is apparent from the above description, the apparatus and method for displaying vehicle information according to the embodiments of the present disclosure can be equally applied not only to a vehicle with a general B-pillar but also to a new concept vehicle with no pillars.

The embodiments of the present disclosure provide an apparatus for displaying information requiring confirmation when a user boards or alights from the vehicle in consideration of convenience of the user who has to perform such confirmation, and a method for efficiently displaying information using the apparatus.

The information display optical system is applied to the B-pillar region, so that natural information transmission before the user boards the vehicle or after the user boards the vehicle can be performed.

The above-described information that requires confirmation when the user boards or alights from the vehicle can also be efficiently displayed on the limited B-pillar region.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A method of controlling a display unit to display information when a user boards or alights from a vehicle, comprising:

detecting, using a wireless communication unit, whether the user boards the vehicle;

in response to detecting that the user boards the vehicle, displaying, on a display region of the display unit, boarding-user information required to be confirmed by the user boarding the vehicle, the display region disposed between a first-column window and a second-column window of an exterior side surface of the vehicle;

detecting, using the wireless communication unit, whether the user alights from the vehicle; and in response to detecting that the user alights from the vehicle, displaying, on the display region of the display unit, alighting-user information required to be confirmed by the user alighting from the vehicle.

2. The method according to claim 1, wherein the boarding-user information includes at least one of:

location information that requires confirmation of an external impact of the vehicle;

locking/unlocking information;

battery charging rate information;

drivable distance information;

temperature information;

expected weather information; or frequently-used road traffic information.

3. The method according to claim 1, wherein the alighting-user information includes at least one of:

information on items left in the vehicle;

infant/child information; or companion animal information.

4. The method according to claim 1, further comprising outputting, using a speaker, a sound providing the boarding-user information or the alighting-user information.

5. An apparatus for displaying information when a user boards or alights from a vehicle, the apparatus comprising:

a wireless communication unit configured to detect when the user returns to board the vehicle;

a display unit having a display region between a first-row window and a second-row window on a side surface of the vehicle; and a controller configured, in response to the wireless communication unit detecting that the user returns to board the vehicle, to control the display unit to display, on the display region, information about an event detected since the user left the vehicle for user inspection;

wherein the event detected since the user left the vehicle comprises an impact to the vehicle while parked, the impact occurring after the user last left the vehicle, the display unit displaying information related to the impact so that the user may inspect the vehicle for damage due to the impact.

6. The apparatus of claim 5, wherein the information related to the impact includes a location on the vehicle where the impact to the vehicle occurred while parked for inspection by the user.

* * * * *